US012334632B2

(12) United States Patent
Qin et al.

(10) Patent No.: US 12,334,632 B2
(45) Date of Patent: Jun. 17, 2025

(54) ANTENNA ASSEMBLY AND COMMUNICATION SYSTEM

(71) Applicant: ANHUI ANUKI TECHNOLOGIES CO., LTD., Anhui (CN)

(72) Inventors: Kun Qin, Anhui (CN); Jian Niu, Anhui (CN); Chengjie Zuo, Anhui (CN); Jun He, Anhui (CN)

(73) Assignee: ANHUI ANUKI TECHNOLOGIES CO., LTD., Anhui (CN)

( * ) Notice: Subject to any disclaimer, the term of this patent is extended or adjusted under 35 U.S.C. 154(b) by 0 days.

(21) Appl. No.: 18/027,238

(22) PCT Filed: Aug. 5, 2022

(86) PCT No.: PCT/CN2022/110650

§ 371 (c)(1),
(2) Date: Mar. 20, 2023

(87) PCT Pub. No.: WO2023/138034

PCT Pub. Date: Jul. 27, 2023

(65) Prior Publication Data

US 2024/0291141 A1 Aug. 29, 2024

(30) Foreign Application Priority Data

Jan. 18, 2022 (CN) ......................... 202210056152.8

(51) Int. Cl.
*H01Q 1/50* (2006.01)
*H01Q 1/36* (2006.01)

(52) U.S. Cl.
CPC ............... *H01Q 1/50* (2013.01); *H01Q 1/362* (2013.01)

(58) Field of Classification Search
CPC .......... H01Q 1/50; H01Q 1/362; H01Q 23/00; H01Q 5/335; H01Q 15/0006
See application file for complete search history.

(56) References Cited

U.S. PATENT DOCUMENTS 6,784,762 B2 * 8/2004 Kato .................... H03H 7/1775 333/204
10,171,063 B2 * 1/2019 Lee .......................... H01Q 5/50
(Continued)

FOREIGN PATENT DOCUMENTS

CN 1433105 A 7/2003
CN 205723920 U 11/2016
(Continued)

OTHER PUBLICATIONS

International Search Report and Written Opinion issued in related PCT Application No. PCT/CN2022/110650, on Sep. 30, 2022, in 10 pages.

(Continued)

*Primary Examiner* — Seung H Lee
(74) *Attorney, Agent, or Firm* — Davis Wright Tremaine LLP

(57) ABSTRACT

Provided are an antenna assembly and a communication system, relating to the technical field of antennas. The antenna assembly comprises a filter module and an antenna module, wherein the antenna module is connected to the filter module, and the antenna module is integrated with the filter module, wherein an output impedance of the filter module is matched with an input impedance of the antenna module.

19 Claims, 2 Drawing Sheets

(56) References Cited

U.S. PATENT DOCUMENTS

| | | | | |
|---|---|---|---|---|
| 2009/0066448 | A1 | 3/2009 | Ho et al. | |
| 2012/0208473 | A1 | 8/2012 | Aparin | |
| 2015/0349821 | A1 | 12/2015 | Rai et al. | |
| 2017/0288707 | A1* | 10/2017 | Yun | H04B 1/0057 |
| 2023/0062103 | A1* | 3/2023 | Yoon | H04B 1/0458 |

FOREIGN PATENT DOCUMENTS

| | | | |
|---|---|---|---|
| CN | 107785939 | A | 3/2018 |
| CN | 109861002 | A | 7/2019 |
| CN | 113394559 | A | 9/2021 |
| CN | 215266663 | U | 12/2021 |
| CN | 114389005 | A | 4/2022 |
| EP | 0772254 | A1 | 5/1997 |
| JP | 2000286634 | A | 10/2000 |
| JP | 2000349532 | A | 12/2000 |
| JP | 2005210680 | A | 8/2005 |
| JP | 2008294809 | A | 4/2008 |
| JP | 2008148345 | A | 6/2008 |
| JP | 2023518258 | A | 4/2023 |
| WO | 2010104179 | A1 | 9/2010 |
| WO | 2013008375 | A1 | 1/2013 |
| WO | 2013115158 | A1 | 8/2013 |
| WO | 2017077852 | A1 | 5/2017 |

OTHER PUBLICATIONS

Japan Patent Office, "Decision to Grant a Patent" in Application No. 2023-518258, Dec. 16, 2024, 5 pages.

The State Intellectual Property Office of People's Republic of China, "Notification to Grant Patent Right for Invention" in Application No. 202210056152.8, Jun. 3, 2024, 3 pages.

Japan Patent Office, "Notice of Reasons for Refusal", in Application No. 2023-518258, May 27, 2024, 16 pages.

The State Intellectual Property Office of People's Republic of China, "First Office Action" in Application No. 202210056152.8, Nov. 14, 2023, 10 pages.

The State Intellectual Property Office of People's Republic of China, "Second Office Action" in Application No. 202210056152.8, Feb. 29, 2024, 7 pages.

The State Intellectual Property Office of People's Republic of China, "First Search Priority" in Application No. 202210056152.8, date of filing Janaury 18, 2022, 1 page.

* cited by examiner

ANTENNA ASSEMBLY AND COMMUNICATION SYSTEM

CROSS-REFERENCE TO RELATED APPLICATIONS

The present disclosure is a 371 U.S. National Phase of International Patent Application No. PCT/CN2022/110650, filed Aug. 5, 2022, entitled "ANTENNA ASSEMBLY AND COMMUNICATION SYSTEM," which claims priority to Chinese Application No. 202210056152.8, filed on Jan. 18, 2022, the contents of which are incorporated herein by reference in their entirety.

TECHNICAL FIELD

The present disclosure relates to the technical field of antennas, and in particular to an antenna assembly and a communication system.

BACKGROUND ART

In related communication systems, a filter chip and an antenna chip, as two key devices for receiving/transmitting signals, are usually designed independently of each other. In order to avoid impedance mismatch between the two when being cascaded, a matching circuit needs to be added between a filter and an antenna.

However, after the matching circuit is added, the dimension and the insertion loss of the whole system will be increased.

In summary, the related art has a problem that the dimension and the insertion loss of the communication system are relatively large.

SUMMARY

An objective of the present disclosure lies in providing an antenna assembly and a communication system, so as to solve the problem that the dimension and the insertion loss of the communication system are relatively large existing in the related art.

In order to achieve the above objective, a technical solution used in the present disclosure is as follows.

An embodiment of the present disclosure provides an antenna assembly, wherein the antenna assembly includes a filter module and an antenna module, the antenna module is connected to the filter module, and the antenna module is integrated with the filter module, and wherein an output impedance of the filter module is matched with an input impedance of the antenna module.

Optionally, the filter module may include multiple stages of LC filtering structures, the multiple stages of filtering structures are connected in sequence; the antenna module includes a 3D spiral inductor, and the 3D spiral inductor is connected to the LC filtering structures, wherein the 3D spiral inductor also constitutes an LC filtering structure.

Optionally, the antenna assembly further may include a connecting post, the filter module includes a substrate, the 3D spiral inductor is arranged on the filter module, and the 3D spiral inductor is connected to the filter module through the connecting post, wherein an interval between the 3D spiral inductor and the substrate is greater than 200 μm.

Optionally, the connecting post may be a copper post, wherein a working frequency of the antenna module is finely adjusted by adjusting a height of the copper post.

Optionally, a support post may be disposed between the 3D spiral inductor and the filter module.

Optionally, the 3D spiral inductor may be in a folded line arrangement.

Optionally, the antenna assembly further may include an LC network, the LC network is connected between the antenna module and the filter module, and the filter module and the antenna module realize impedance matching through the LC network.

Optionally, the LC network may include a T-type network, a Pi-type network, and an L-type network.

Optionally, the LC network may include an inductor and a capacitor, and matching between the output impedance of the filter module and the input impedance of the antenna module is realized by adjusting structural parameters of the capacitor and the inductor.

Optionally, a capacitance value of the capacitor may be in pF level, a plate spacing may be 10~30 μm, and a plate thickness may be 10 μm; an inductance value of the inductor may be in nH level, a width of the inductor may be 5~20 μm, and a thickness of the inductor may be 10 μm.

Optionally, the capacitor of the LC network may be a planar capacitor or a multi-layer capacitor structure.

Optionally, the filter module may include multiple stages of filtering structures, the multiple stages of filtering structures are connected in sequence, and a last-stage filtering structure is connected to the antenna module, wherein an output impedance of the last-stage filtering structure may be matched with the input impedance of the antenna module.

Optionally, the filter module may include multiple stages of LC filtering structures, and a capacitive reactance value and/or an inductive reactance value of the last-stage LC filtering structure are adjustable, so as to match the output impedance of the last-stage LC filtering structure and the input impedance of the antenna module.

Optionally, the output impedance of the last-stage LC filtering structure and the input impedance of the antenna module can be matched in a following adjusting manner; separately adjusting the capacitive reactance value or the inductive reactance value of the last-stage LC filtering structure, or simultaneously adjusting the capacitive reactance value and the inductive reactance value of the last-stage LC filtering structure, wherein when the capacitive reactance value is adjusted, a plate spacing and a plate thickness of the capacitor are adjusted; and when the inductive reactance value is adjusted, a width, a thickness, a spiral radius, a spiral height, a spiral angle, and a number of turns of the inductor are adjusted.

Optionally, the antenna module may include a direct feeding structure or an electromagnetic coupling feeding structure, wherein a position and a dimension of the direct feeding structure or the electromagnetic coupling feeding structure are adjustable, so as to match impedance between the filter module and the antenna module.

Optionally, the antenna module may include a direct feeding structure or an electromagnetic coupling feeding structure, wherein a position and a dimension of the direct feeding structure or the electromagnetic coupling feeding structure are adjustable; and the filter module includes multiple stages of LC filtering structures, wherein a capacitive reactance value and/or an inductive reactance value of the last-stage LC filtering structure are also adjustable, so as to match impedance between the filter module and the antenna module.

An embodiment of the present disclosure further provides a communication system, wherein the communication system may include the above antenna assembly.

Compared with the related technology, the present disclosure has the following beneficial effects:

the embodiments of the present disclosure provide an antenna assembly and a communication system, wherein the antenna assembly includes a filter module and an antenna module, the antenna module is connected to the filter module, and the antenna module is integrated with the filter module, wherein an output impedance of the filter module is matched with an input impedance of the antenna module. On one hand, compared with the related art, the present disclosure omits an impedance matching circuit, which facilitates the miniaturization of the communication system, and reduces insertion loss of the system. On the other hand, as the antenna module is integrated with the filter module, the miniaturization is further realized. In addition, the output impedance of the filter module is matched with the input impedance of the antenna module, satisfying the impedance matching requirement In order to make the above objectives, features, and advantages of the present disclosure clearer and understandable, preferred embodiments are particularly illustrated below to make detailed description as follows with reference to the drawings.

BRIEF DESCRIPTION OF DRAWINGS

In order to more clearly illustrate technical solutions of embodiments of the present disclosure, drawings which need to be used in the embodiments will be introduced briefly below, and it should be understood that the drawings below merely show some embodiments of the present disclosure, therefore, they should not be considered as limitation on the scope, and those ordinarily skilled in the art still could obtain other relevant drawings according to these drawings, without using any creative efforts.

Figure 1:
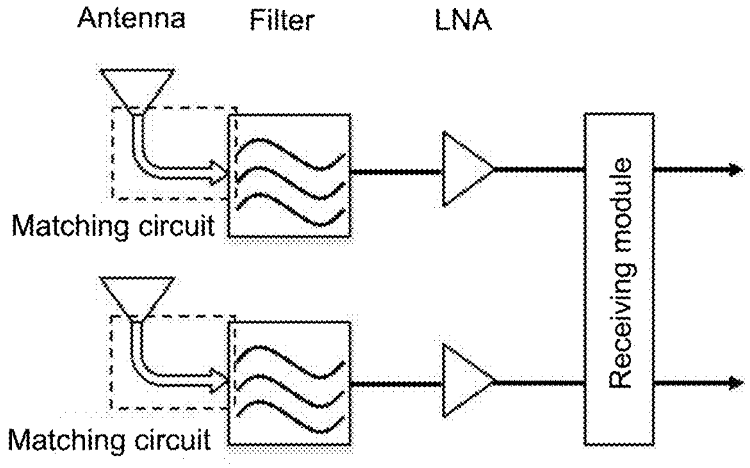
FIG. 1 is a modular schematic diagram of a communication system in the related art.

In the drawings: 100—antenna assembly; 110—filter module; 120—antenna module; 111—substrate; 140—connecting post.

DETAILED DESCRIPTION OF EMBODIMENTS

In order to make objectives, technical solutions, and advantages of the embodiments of the present disclosure clearer, the technical solutions in the embodiments of the present disclosure will be described clearly and completely below with reference to drawings in the embodiments of the present disclosure, and apparently, the embodiments described are some but not all embodiments of the present disclosure. Generally, components in the embodiments of the present disclosure, as described and shown in the drawings herein, may be arranged and designed in various different configurations.

Therefore, the detailed description below of the embodiments of the present disclosure provided in the drawings is not intended to limit the claimed scope of the present disclosure, but merely illustrates chosen embodiments of the present disclosure. All of other embodiments obtained by those ordinarily skilled in the art based on the embodiments in the present disclosure without using any creative efforts shall fall within the scope of protection of the present disclosure.

It should be noted that similar reference signs and letters represent similar items in the following drawings; therefore, once a certain item is defined in one drawing, it is not needed to be defined or explained in subsequent drawings. Meanwhile, in the description of the present disclosure, terms such as “first” and “second” are merely used for distinguishing the description, but should not be construed as indicating or implying importance in the relativity.

It should be indicated that in the present text, relational terms such as first and second are merely for distinguishing one entity or operation from another entity or operation, while it is not required or implied that these entities or operations necessarily have any such practical relation or order.

Some embodiments of the present disclosure are described in detail below in combination with the drawings. The following embodiments and features in the embodiments may be combined with each other without conflict.

As described in Background Art, referring to FIG. 1, a matching circuit needs to be added between a filter and an antenna in a related communication system, but the dimension and the insertion loss of the whole system will be increased after the matching circuit is added.

In view of this, in order to solve the above problems, the present disclosure provides an antenna assembly that realizes the miniaturization of a system and reduces the insertion loss by eliminating the matching circuit.

Hereinafter, the antenna assembly provided in the present disclosure is exemplarily described.

Figure 2:
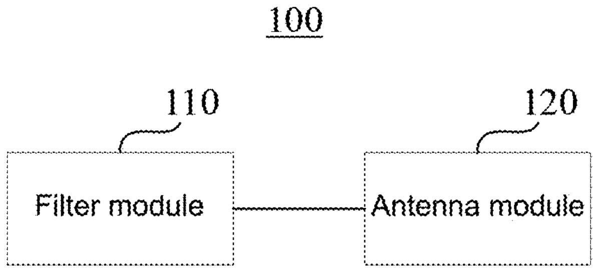
FIG. 2 is a modular schematic diagram of an antenna assembly provided in an embodiment of the present disclosure.

As an optional embodiment, referring to FIG. 2, the antenna assembly 100 may include a filter module 110 and an antenna module 120, wherein the antenna module 120 is connected to the filter module 110, and the antenna module 120 is integrated with the filter module 110, and wherein an output impedance of the filter module 110 is matched with an input impedance of the antenna module 120.

Through the above implementation mode, on one hand, compared with the related art, the present disclosure omits an impedance matching circuit, which facilitates the miniaturization of the communication system, and reduces insertion loss of the system. On the other hand, as the antenna module 120 is integrated with the filter module 110, the miniaturization is further realized. In addition, the output impedance of the filter module 110 is matched with the input impedance of the antenna module 120, satisfying the impedance matching requirement.

It should be noted that in conventional designs, the filter and the antenna are individually designed to be impedance-matched with a common reference impedance (50 ohm or 75 ohm). However, when the matching circuit is omitted, the filter chip and the antenna chip are directly cascaded, both structures will generate parasitic parameters, and these parasitic parameters will affect the impedance matching between the chips. Meanwhile, when the two are cascaded, they are relatively close to each other, then a coupling effect is generated, which also reduces the product performance.

Therefore, in order to realize the matching between the output impedance of the filter and the input impedance of the antenna, the impedance matching design between the two can be adjusted. Further, the interference of parasitic parameters between the two is eliminated, and the influence of the coupling effect is reduced. In the above, the matching described in the present disclosure refers to matching between the output impedance of the filter and the input impedance of the antenna. The impedance matching structure may be realized in a number of different forms, as exemplified below.

As an optional implementation, the antenna assembly further may include an LC network, the LC network is connected between the antenna module 120 and the filter module 110, and the filter module 110 and the antenna module 120 realize the impedance matching through the LC network.

In the above, the LC network includes devices such as an inductor and a capacitor, and the matching between the output impedance of the filter module 110 and the input impedance of the antenna module 120 is realized by adjusting structural parameters of the capacitor and the inductor, for example, adjusting the thickness and the size of the capacitor and the inductor in the LC network. Optionally, a capacitance value of the capacitor can be in pF level, a plate spacing can be 10~30 μm, and a plate thickness can be 10 μm. An inductance value of the inductor can be in nH level, and a width of the inductor can be 5~20 μm, and a thickness of the inductor can be 10 μm.

As an optional implementation, the LC network may include a T-type network, a Pi-type network, and an L-type network, and certainly, a specific structure thereof may not be limited. For example, designs such as series capacitors+parallel inductors are used, wherein the series structure does not need a separate ground port, and the parallel structure needs a separate ground port. Optionally, the capacitor in the LC network may use a planar capacitor or a multi-layer capacitor structure, which is not limited herein, either.

Certainly, the impedance matching between the filter module 110 and the antenna module 120 also may be realized without adding an LC network, and on this basis, the impedance matching can be realized by adjusting relevant parameters of the filter module 110 and/or the antenna module 120.

As another optional implementation, the impedance matching may be realized by adjusting relevant parameters of the filter module 110. In the above, the filter module 110 includes multiple stages of filtering structures, wherein the multiple stages of filtering structures are connected in sequence, and a last-stage filtering structure is connected to the antenna module 120, and wherein an output impedance of the last-stage filtering structure is matched with the input impedance of the antenna module 120.

In the above, the filter module 110 includes the multiple stages of filtering structures, and the present disclosure does not limit the specific filtering structure, for example, the multiple stages of filtering structures may be LC filtering structures, or may be cavities or other types of filters.

For convenience of illustration, the present disclosure is illustrated by taking that the filter module 110 includes multiple stages of LC filtering structure as an example, and a capacitive reactance value and/or an inductive reactance value of the last-stage LC filtering structure are adjustable, so as to match the output impedance of the last-stage LC filtering structure and the input impedance of the antenna module 120.

For example, when the filter module 110 includes 4 stages of LC filtering structures, a first-stage LC filtering structure is connected to a second-stage LC filtering structure, the second-stage LC filtering structure is connected to a third-stage LC filtering structure, and the third-stage LC filtering structure is connected to a fourth-stage LC filtering structure, wherein the fourth-stage LC filtering structure is the last-stage LC filtering structure, and is connected to the antenna module 120.

In related communication systems, the last-stage filtering structure of the filter chip will match to 50 ohm output, while the antenna module 120 will also match to 50 ohm input, realizing the matching. But in the present disclosure, the output impedance of the filter module can be adjusted according to the input impedance of the antenna module 120, further realizing the matching. Moreover, it should be emphasized that the impedance matching between the filter module 110 and the antenna module 120 described in the present disclosure refers to the matching between the input impedance of the antenna module 120 and the output impedance of the last-stage LC filtering structure in the filter module 110.

It should be noted that, in a specific adjustment process, the last-stage LC filtering structure is actually directly matched to the input impedance of the antenna by adjusting the LC value in the last-stage filtering structure. On this basis, the capacitive reactance value of the capacitor in the last-stage LC filtering structure can be independently adjusted, or the inductive reactance value of the inductor in the last-stage LC filtering structure can be independently adjusted, for example, the impedance matching with the filtering structure is realized by adjusting physical parameters of the inductive structure, such as a spiral radius, a spiral height, a spiral angle, and a number of turns; or by simultaneously adjusting the capacitive reactance value of the capacitor and the inductive reactance value of the inductor in the last-stage LC filtering structure.

When the capacitive reactance value of the capacitor and the inductive reactance value of the inductor are adjusted, the structural parameters of the capacitor and the inductor can be adjusted to realize the impedance matching. For example, when the capacitive reactance value of the capacitor is adjusted, a plate spacing, a plate thickness and the like of the capacitor can be adjusted; and when the inductive reactance value of the inductor is adjusted, a width, a thickness, a spiral radius, a spiral height, a spiral angle, a number of turns and the like of the inductor can be adjusted.

As another optional implementation, the impedance matching can be realized by adjusting relevant parameters of the antenna module 120. On this basis, the antenna module 120 includes a feeding structure, wherein the feeding structure may be a direct feeding structure, or may be an electromagnetic coupling feeding structure, for example, in the form of a coupling hole, a coupling slot, and a coupling line, which is not limited herein. The position and dimension of the feeding structure can be adjusted, so as to match the impedance between the filter module 110 and the antenna module 120. That is, in the present disclosure, the output impedance of the filter module 110 is maintained, the position and dimension of the feeding structure in the antenna module 120 are adjusted. By adjusting the physical parameters of the direct feeding structure or the coupling feeding structure, the coupling coefficient between the antenna module and the filter can be changed, further realizing the impedance matching between the antenna module 120 and the filter module 110.

Optionally, by adjusting the coupling coefficient between the antenna module and the filter, the antenna module can serve as a first-stage resonant structure, further optimizing the performance of the filter.

It should be noted that in related communication systems, the input impedance of the antenna chip is 50 ohm. In the present disclosure, by adjusting the feeding structure of the antenna module 120, the input impedance of the antenna is matched with the filter chip. On this basis, due to the influence of the coupling effect, the output impedance of the filter module 110 may no longer be 50 ohm, and in this case, the input impedance of the filter module 110 is no longer adjusted, but parameters such as relative position and physical dimension of the feeding structure in the antenna module 120 are adjusted, realizing the impedance matching.

As another optional implementation mode, the impedance matching can be realized by simultaneously adjusting relevant parameters of the antenna module 120 and the filter module 110. In order to avoid extreme values and limited processing technologies appeared in the adjustment process, the impedance matching between the filter module 110 and the antenna module 120 can be more flexibly realized by simultaneously adjusting the two. For example, after the impedance matching, each of the input impedance of the antenna module 120 and the output impedance of the filter module 110 is 50 ohm, or other values.

Furthermore, in order to further realize miniaturization of the communication system, the antenna module 120 and the filter module 110 provided in the present disclosure may be further integrated.

Figure 3:
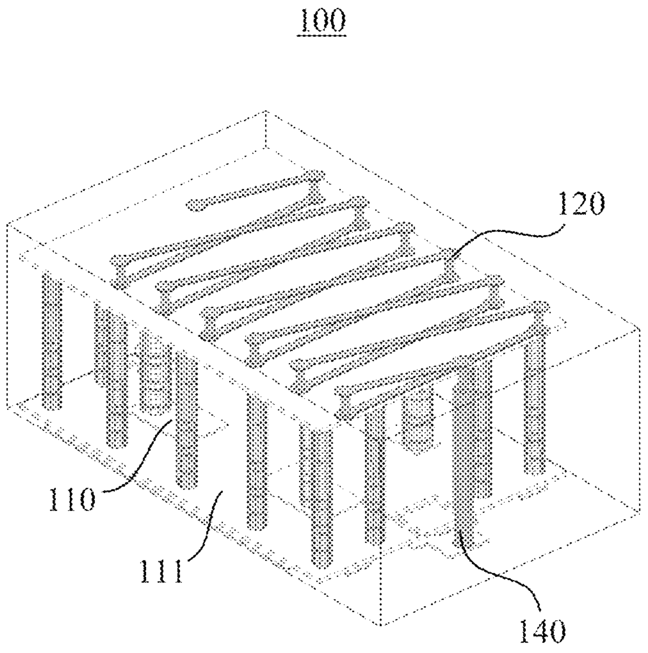
FIG. 3 is a structural schematic diagram of the antenna assembly provided in an embodiment of the present disclosure.

As an optional implementation, referring to FIG. 3, the filter module 110 includes multiple stages of LC filtering structures, and the multiple stages of LC filtering structures are connected in sequence. Optionally, the antenna module provided in the present disclosure may include a planar spiral inductor or a 3D spiral inductor, wherein when the antenna module 120 includes a 3D spiral inductor, the 3D spiral inductor is connected to the LC filtering structures; and 3D spiral inductor also constitutes an LC filtering structure.

That is, in the present disclosure, the antenna module 120 may also serve as an LC filtering structure, and further the characteristics of impedance matching and antenna radiation can be simultaneously achieved. In the above, the spiral inductor per se has inductance characteristic, and an inductive reactance value thereof is related to the structure. By adjusting line width, spiral spacing and the like of the inductor, a parasitic capacitance can be generated, further constituting an LC filtering structure, and realizing a certain filtering function.

That is, in the present disclosure, the adjustment of the input impedance of the antenna is realized by adjusting the structure of the spiral inductor, and the matching between the filtering structure and the antenna is directly realized. Meanwhile, on the one hand, the LC filtering structure constituted by the 3D spiral inductor may be considered as the last-stage LC filtering structure of the filter module 110, realizing the impedance matching more conveniently. On the other hand, the LC filtering structure constituted by the 3D spiral inductor has a filtering effect, so that the LC filtering structures in the filter module 110 are reduced. For example, in the communication system, when four stages of LC filtering structures are needed, in actual manufacturing, only three stages of LC filtering structures in the filter module 110 need to be manufactured, and the 3D spiral inductor may serve as the last-stage LC filtering structure, so that the same filtering effect is realized by using the antenna module 120 while reducing the LC filtering structures in the filter module 110.

In addition, in the present embodiment, the filtering antenna works in a UWB frequency band, the spiral inductor is placed on an upper surface of the filter module 110, and a certain interval is required between the antenna module 120 and the ground. On this basis, the antenna module 120 further includes a connecting post 140, the filter module 110 includes a substrate 111, the 3D spiral inductor is arranged on the filter module 110, and the 3D spiral inductor is electrically connected to the filter module through the connecting post 140, wherein the interval between the 3D spiral inductor and the substrate 111 is greater than 200 μm. Definitely, a support post also may be arranged between the 3D spiral inductor and the filter module.

Optionally, the connecting post 140 in the present disclosure may be a copper post. Moreover, a working frequency of the antenna module 120 can be finely adjusted by adjusting the height of the copper post. An overall height of the spiral inductor is 300 μm, a number of spiral turns is 5, and a spiral angle is 12 degrees. A line width of the spiral inductor is 90 μm, and a line length is 650 μm.

Furthermore, in order to better make the 3D spiral inductor generate the parasitic capacitance, the 3D spiral inductor is in a folded line arrangement, so that when the inductor is constituted, two connected coils are arranged in parallel, and the capacitance feature is more obvious.

Based on the above implementation, the present disclosure further provides a communication system, wherein the communication system includes the above antenna assembly.

To sum up, the embodiments of the present disclosure provide an antenna assembly and a communication system. The antenna assembly includes a filter module and an antenna module, wherein the antenna module is connected to the filter module, and the antenna module is integrated with the filter module, and wherein an output impedance of the filter module is matched with an input impedance of the antenna module. On one hand, compared with the related art, the present disclosure omits an impedance matching circuit, which facilitates the miniaturization of the communication system; and reduces insertion loss of the system. On the other hand, as the antenna module is integrated with the filter module, the miniaturization is further realized. In addition, the output impedance of the filter module is matched with the input impedance of the antenna module, satisfying the impedance matching requirement.

The above-mentioned are merely for preferred embodiments of the present disclosure and not used to limit the present disclosure. For one skilled in the art, various modifications and changes may be made to the present disclosure. Any modifications, equivalent substitutions, improvements and so on, within the spirit and principle of the present disclosure, should be covered within the scope of protection of the present disclosure.

For one skilled in the art, obviously, the present disclosure is not limited to details of the above exemplary embodiments, and without departing from the spirit or basic features of the present disclosure, the present disclosure could be implemented in other specific forms. Therefore, no matter from which point of view, the embodiments should be regarded as exemplary but non-limiting, the scope of the present disclosure is defined by the appended claims rather than the above description, and therefore, all changes falling within the meaning and scope of equivalents of the claims are intended to be covered within the present disclosure. Reference signs in the claims should not be regarded as limiting the claims.

INDUSTRIAL APPLICABILITY

The present disclosure provides an antenna assembly and a communication system. The antenna assembly includes a filter module and an antenna module, wherein the antenna module is connected to the filter module, and the antenna module is integrated with the filter module, and wherein an output impedance of the filter module is matched with an input impedance of the antenna module. On one hand, compared with the related art, the present disclosure omits an impedance matching circuit, which facilitates the miniaturization of the communication system, and reduces insertion loss of the system. On the other hand, as the antenna module is integrated with the filter module, the miniaturization is further realized. In addition, the output impedance of the filter module is matched with the input impedance of the antenna module, satisfying the impedance matching requirement.

Besides, it may be understood that the antenna assembly and the communication system in the present disclosure may be reproduced, and may be used in a variety of industrial applications. For example, the antenna assembly and the communication system in the present disclosure may be used in the technical field of antennas.

What is claimed is:

1. An antenna assembly, comprising a filter module and an antenna module, wherein the antenna module is connected to the filter module, and the antenna module is integrated with the filter module, and wherein an output impedance of the filter module is matched with an input impedance of the antenna module, wherein the filter module comprises multiple stages of LC filtering structures, the multiple stages of filtering structures are connected in sequence; and the antenna module comprises a 3D spiral inductor, the 3D spiral inductor is connected to the LC filtering structures, wherein the 3D spiral inductor also constitutes an LC filtering structure.

2. The antenna assembly according to claim 1, wherein the antenna assembly further comprises a connecting post, the filter module comprises a substrate, the 3D spiral inductor is arranged on the filter module, and the 3D spiral inductor is connected to the filter module through the connecting post, wherein an interval between the 3D spiral inductor and the substrate is greater than 200 μm.

3. The antenna assembly according to claim 2, wherein the connecting post is a copper post, and wherein a working frequency of the antenna module is finely adjusted by adjusting a height of the copper post.

4. The antenna assembly according to claim 3, wherein a support post is arranged between the 3D spiral inductor and the filter module.

5. The antenna assembly according to claim 2, wherein a support post is arranged between the 3D spiral inductor and the filter module.

6. The antenna assembly according to claim 2, wherein the 3D spiral inductor is in a folded line arrangement.

7. The antenna assembly according to claim 1, wherein a support post is arranged between the 3D spiral inductor and the filter module.

8. The antenna assembly according to claim 1, wherein the 3D spiral inductor is in a folded line arrangement.

9. The antenna assembly according to claim 1, wherein the antenna assembly further comprises an LC network, the LC network is connected between the antenna module and the filter module, and the filter module and the antenna module realize impedance matching through the LC network.

10. The antenna assembly according to claim 9, wherein the LC network comprises a T-type network, a Pi-type network, and an L-type network.

11. The antenna assembly according to claim 9, wherein the LC network comprises an inductor and a capacitor, and matching between the output impedance of the filter module and the input impedance of the antenna module is realized by adjusting structural parameters of the capacitor and the inductor.

12. The antenna assembly according to claim 11, wherein a capacitance value of the capacitor is in pF level, a plate spacing is 10~30 μm, and a plate thickness is 10 μm; and an inductance value of the inductor is in nH level, a width of the inductor is 5~20 μm, and a thickness of the inductor is 10 μm.

13. The antenna assembly according to claim 11, wherein the capacitor of the LC network is a planar capacitor or a multi-layer capacitor structure.

14. The antenna assembly according to claim 1, wherein the filter module comprises multiple stages of filtering structures, the multiple stages of filtering structures are connected in sequence, and a last-stage filtering structure is connected to the antenna module, wherein an output impedance of the last-stage filtering structure is matched with the input impedance of the antenna module.

15. The antenna assembly according to claim 14, wherein the filter module comprises multiple stages of LC filtering structure, and a capacitive reactance value and/or an inductive reactance value of the last-stage LC filtering structure are adjustable, so as to match the output impedance of the last-stage LC filtering structure and the input impedance of the antenna module.

16. The antenna assembly according to claim 15, wherein the output impedance of the last-stage LC filtering structure and the input impedance of the antenna module are matched in a following adjusting manner: adjusting the capacitive reactance value or the inductive reactance value of the last-stage LC filtering structure separately, or adjusting the capacitive reactance value and the inductive reactance value of the last-stage LC filtering structure simultaneously, wherein when the capacitive reactance value is adjusted, a plate spacing and a plate thickness of the capacitor are adjusted; and when the inductive reactance value is adjusted, a width, a thickness, a spiral radius, a spiral height, a spiral angle, and a number of turns of the inductor are adjusted.

17. The antenna assembly according to claim 1, wherein the antenna module comprises a direct feeding structure or an electromagnetic coupling feeding structure, and a position and a dimension of the direct feeding structure or the electromagnetic coupling feeding structure are adjustable, so as to match impedances of the filter module and the antenna module.

18. The antenna assembly according to claim 1, wherein the antenna module comprises a direct feeding structure or an electromagnetic coupling feeding structure, a position and a dimension of the direct feeding structure or the electromagnetic coupling feeding structure are adjustable; and the filter module comprises multiple stages of LC filtering structures, and a capacitive reactance value and/or an inductive reactance value of the last-stage LC filtering structure are also adjustable, so as to match impedances of the filter module and the antenna module.

19. A communication system, comprising the antenna assembly according to claim 1.

* * * * *